US012595383B2

(12) United States Patent
Gu et al.

(10) Patent No.: US 12,595,383 B2
(45) Date of Patent: Apr. 7, 2026

(54) SILICA-BASED MATTING FORMULATIONS AND METHODS OF MAKING AND USING THE SAME

(71) Applicant: W.R. Grace & Co.-CONN., Columbia, MD (US)

(72) Inventors: Feng Gu, Ellicott City, MD (US); James Neil Pryor, West Friendship, MD (US); Manoj Koranne, Clarksville, MD (US)

(73) Assignee: W.R. Grace & Co.-CONN., Columbia, MD (US)

( * ) Notice: Subject to any disclaimer, the term of this patent is extended or adjusted under 35 U.S.C. 154(b) by 1086 days.

(21) Appl. No.: 17/636,809

(22) PCT Filed: Aug. 19, 2020

(86) PCT No.: PCT/US2020/046935
§ 371 (c)(1),
(2) Date: Feb. 18, 2022

(87) PCT Pub. No.: WO2021/041101
PCT Pub. Date: Mar. 4, 2021

(65) Prior Publication Data
US 2022/0298365 A1 Sep. 22, 2022

Related U.S. Application Data

(60) Provisional application No. 62/894,299, filed on Aug. 30, 2019.

(51) Int. Cl.
C09D 7/42 (2018.01)
C09D 5/02 (2006.01)

(52) U.S. Cl.
CPC .............. C09D 7/42 (2018.01); C09D 5/028 (2013.01)

(58) Field of Classification Search
None
See application file for complete search history.

(56) References Cited

U.S. PATENT DOCUMENTS 5,792,808 A 8/1998 Sobuttka et al.
8,926,748 B2 * 1/2015 Lehnert ..................... C09C 3/10
428/404

(Continued)

FOREIGN PATENT DOCUMENTS

JP H02-289670 A 11/1990
JP H08-209029 A 8/1996

(Continued)

OTHER PUBLICATIONS

VN Examination report for application 1-2022-01261 Mailed Dec. 31, 2024, 4 pages.

(Continued)

*Primary Examiner* — Keling Zhang
(74) *Attorney, Agent, or Firm* — DORITY & MANNING, P.A.

(57) ABSTRACT

Improved coating formulations containing silica based matting agents in the form of a blend of low pore volume silica particles and high pore volume silica particles are disclosed. The matting formulations are useful in waterborne coating compositions to provide exceptional properties to a coated substrate. Films resulting from the coating formulations containing silica-based matting agents on a substrate unexpectedly provide improved chemical resistance to the surface of the substrate, in particular wood or plastics. Methods of making and using the silica-based matting formulations are also disclosed.

20 Claims, 1 Drawing Sheet

(56)                    References Cited

U.S. PATENT DOCUMENTS

| 2014/0050928 A1 | 2/2014 | Gebauer et al. |
| 2018/0258292 A1 | 9/2018 | Jeganathan et al. |

FOREIGN PATENT DOCUMENTS

| JP | 2000-126677 | | 5/2000 |
| JP | 2022546696 | A | 11/2022 |
| WO | WO-94/11302 | A1 | 5/1994 |
| WO | WO-95/31508 | A1 | 11/1995 |
| WO | WO-2019/028312 | A1 | 2/2019 |
| WO | WO-2019/144910 | A1 | 8/2019 |

OTHER PUBLICATIONS

International Search Report and Written Opinion on PCT/US2020/046935 dated Nov. 23, 2020, 7 pages.

* cited by examiner

Loading vs. Matting Requirement (for 11-14 Gloss) vs. Chemical Damage

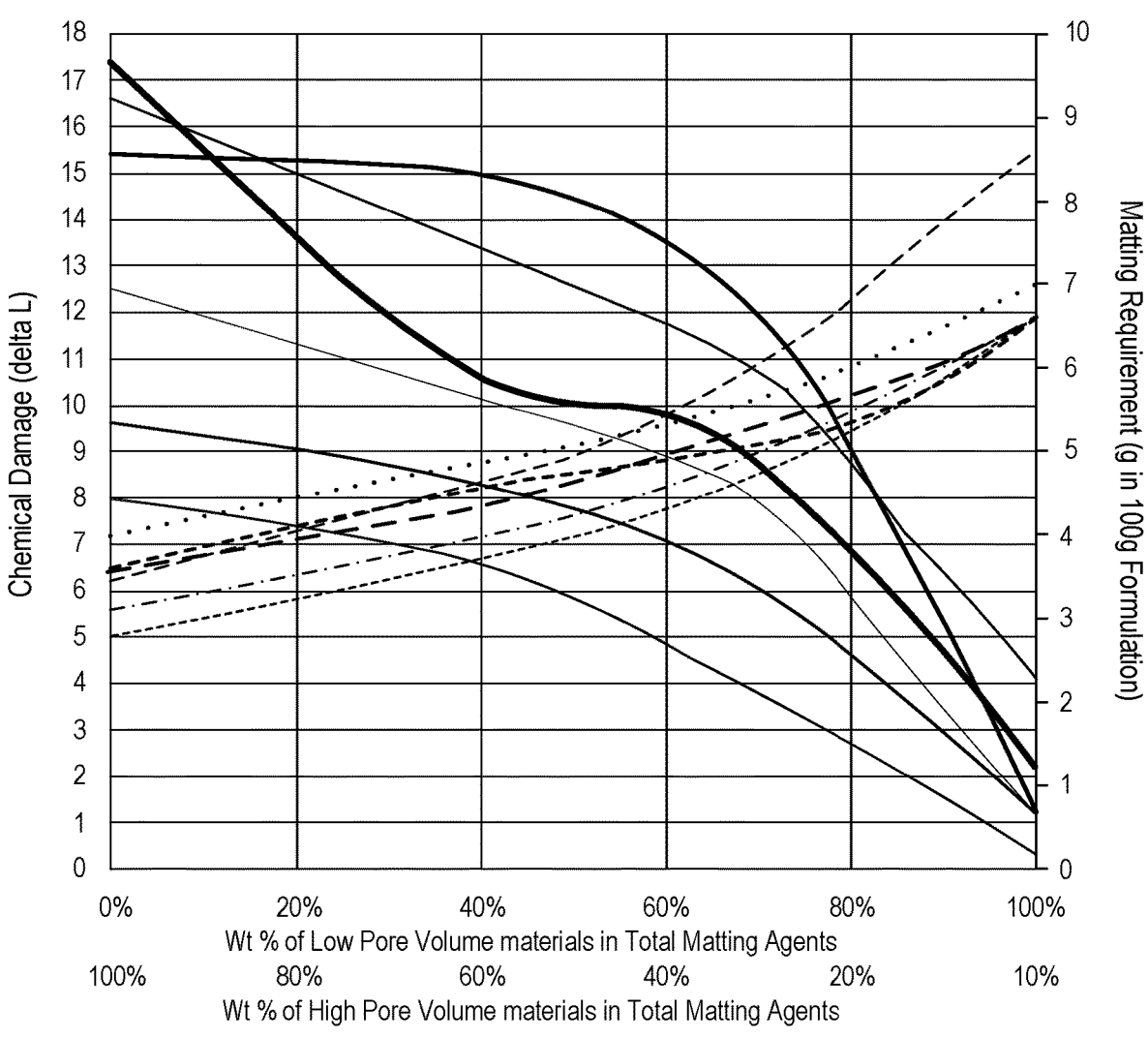

—— Example 1, Chemical Damage
—— Example 2, Chemical Damage
━━ Example 3, Chemical Damage
━━ Example 4, Chemical Damage
— Example 5, Chemical Damage
—— Example 6, Chemical Damage
----- Example 1, Matting Requirement
– – Example 2, Matting Requirement
· · · Example 3, Matting Requirement
– · – Example 4, Matting Requirement
- - - Example 5, Matting Requirement
– – Example 6, Matting Requirement

SILICA-BASED MATTING FORMULATIONS AND METHODS OF MAKING AND USING THE SAME

This application is a U.S. National Phase Application under 35 U.S.C. § 371 of International Application No. PCT/US2020/046935, filed Aug. 19, 2020, which claims the benefit of and priority to U.S. Provisional Patent Application No. 62/894,299, filed Aug. 30, 2019, each of which are incorporated herein by reference in their entirety for any and all purposes.

FIELD OF THE INVENTION

The present invention is directed to improved silica-based matting formulations. In one aspect, the present invention relates to improved silica-based matting formulations for waterborne coating systems. In another aspect, the invention relates to silica-based matting formulations comprising a blend of low pore volume silica particles and high pore volume silica particles, aqueous coating compositions containing the blend of silica particles, and methods of making and using the compositions.

BACKGROUND

Silica-based matting agents are widely used in coating and painting formulations to reduce the gloss of the coated films. In solvent based coating or 100% solid UV-cure formulations, high levels of silica are required for effective gloss reduction and matting. On the other hand, high concentration of hydrophilic silica can cause changes in the rheological properties of the solvent based lacquer and can often have dispensability and settling problems. To solve these problems, typically the prior art is targeted at treating the surface of particulate silica to make the surface thereof hydrophobic and thus more compatible with solvent systems and organics in the formulations. To this end, wax and/or polymer coated silicas have often been used.

U.S. Pat. No. 6,039,798 discloses wax coated silica matting agent wherein the silica is an amorphous silica having a pore volume of at least 1.5 cm³/g, preferably at least 1.8 cm³/g. The wax coating is present in the range from 6% to 15% by weight (wt %) of the matting agent and comprises a synthetic polyethylene wax.

EP0759959 discloses wax coated silica matting agent characterized in that the silica is an amorphous silica having a pore size distribution wherein 90% of the pores have a diameter above 15 nanometers, and less than 20% of the pore volume is in pores having a pore diameter between 10 and 30 nanometers, the wax coating being present in the range from about 2% to about 15% by weight of the matting agent and comprising a hard microcrystalline wax, a plasticizing microcrystalline wax, a synthetic polyethylene wax, or a mixture thereof.

US20050065268 discloses a silica matting agent comprises particulate amorphous silica in which the particles of silica have been treated with a hydrophilic polyolefin wax.

U.S. Pat. No. 6,921,781 discloses coating at least a portion of a surface of at least one silica particle with at least one wax, wherein the coating is carried out in at least one gas at a temperature above the melting point of the wax and below the decomposition temperature of the wax. The wax content is defined as 2-15% weight of that of silica.

U.S. Pat. No. 7,303,624 discloses a structurally coated silica can be prepared by spraying and mixing a pyrogenic silica with water and a coating agent in a suitable mixing vessel, then milling and then conditioning the product.

U.S. Pat. No. 8,926,748 discloses a matting agent useful for the preparation of matted coatings comprising, inorganic oxide particulates; and wax coated on the inorganic oxide particulates, wherein the wax possesses a crystallinity of about 50% or more and said wax is present in an amount ranging from 15 wt % to 30 wt % based on a total weight of said matting agent.

WO 1999051692 discloses an invention relating to a matting agent based on silicon dioxide, the silicon dioxide particles having a particle size of 2.5 to 20 µm and a moisture content of 0 to 65 wt %, based on the matting agent, and being coated with 0.2 to 10 wt % of a urea-urethane derivative or a mixture of urea-urethane derivatives.

Currently, solvent-based coating compositions are undesirable due to environmental concerns and safety and health issues. Government regulations have pushed for the reduction and elimination of volatile organic compounds (VOC) in paint or coating formulations and the use of substantially more waterborne coatings is promoted.

Various types of matting agents have been used in waterborne formulations, including, silica matting agents, organic matting agents, and blends of the two.

Silica-based matting agents such as ACEMATT® TS100 and SYLOID® C807 have excellent matting efficiency, and film clarity in water borne formulations, but tend to have poorer chemical resistance and weather resistance, often whitening or turning cloudy when exposed to chemicals or changing weather conditions. Silica-based matting agents also tend to have poor thermal stress resistance when subjected to rapid change of temperatures. While not wishing to be bound by any particular theory, an adhesive failure at the matting agent-latex interface resulting in a fissure that is an effective scatter of light as well as adhesive failure caused by stresses due to swelling (then shrinkage) of the film during wetting and drying of the film and is aggravated by particle shrinkage of the matting particles during drying, may be the cause of these drawbacks with silica matting agents in waterborne coating formulation. All these drawbacks are undesirable in coating applications on wood or plastic substrates.

Pure organic based organic matting agents have also been used. For example, urea-formaldehyde resin based matting agents, such as DEUTERON® MK and CERAFLOUR® 920, are known. However, both of these matting agents have environmental concerns since they can potentially release residual starting material, toxic formaldehyde. A modified, micronized polyethylene based matting agent CERA-FLOUR® 929 is also available. However, this product has poor matting efficiency when compared to silica-based matting agents in coating formulations. It is also known that organic matting agents have poorer film clarity when compared to pure silica-based matting agents. This is probably due to the fact that silica-based matting agents have a refractive index close to that of other components (for example, binders) in the coated film, whereas the difference in the refractive index of organic based matting agents and such components is larger. In addition, organic matting agents are typically more difficult to produce and more expensive as well.

The blending of silica-based matting agents and organic matting agents has also been used in water borne systems to balance the required coating film properties. However, blending of the two different types of materials does not solve the problems associated with each individual component of the two in the paint formulations or the quality of the coated films. For example, poor film clarity of organic matting agents will still be present with the blends.

Consequently, there remains a need for simple solutions to further develop matting agents that (i) are suitable for use in aqueous coating systems, and (ii) provide clear coat films having improved chemical resistance in combination with good matting efficiency.

SUMMARY

The present invention addresses the aforementioned need in the art by the discovery of improved silica-based matting formulations, which provide good matting efficiency in combination with increased chemical resistance in a coated film resulting from "waterborne" or aqueous coating compositions. Unexpectedly, it has been found that the incorporation of a blend of low pore volume silica particles and high pore volume silica particles as matting formulations in aqueous coating compositions provides increased chemical resistance in films formed from the dried coating composition, in particular, when applied onto a wood or plastic substrate. Advantageously, the aqueous compositions of the present invention also provide exceptional properties of improved film clarity to the surface of a wood or plastic substrate when compared to prior aqueous coated compositions.

Accordingly, the present invention provides silica-based matting formulations for aqueous coating compositions comprising high pore volume silica blended with an amount of low pore volume silica particles that is sufficient to provide, when the matting formulation is incorporated into an aqueous coating composition and dried onto a substrate to form a film, a film having increased chemical resistance at a 60° gloss value target, wherein the high pore volume silica particles have a median pore volume of greater than 0.80 cc/g as determined by Barrett-Joyner-Halenda (BJH) method and the low pore volume silica particles have a median pore volume equal to or less than 0.80 cc/g or less as determined by the BJH method. Typically, the 60° gloss value target is between about 3.0 and about 30.0 as measured using a portable Micro-TRI-Gloss meter.

In some embodiments, at least a portion of (i) the low pore volume silica particles, (ii) the high pore volume silica particles, or (iii) both the low pore volume silica particles and the high pore volume silica particles further comprise one or more waxes in an amount sufficient to at least partially fill pores of the low pore volume silica particles, the high pore volume silica particles, or both the low pore volume silica particles and the high pore volume silica particles. In all embodiments, the blend of low pore volume silica particles and high pore volume silica particles acts as effective matting formulations in aqueous coating compositions and provides increased chemical resistance in films formed from the dried coating composition, in particular, when applied onto a wood or plastic substrate. Advantageously, the aqueous compositions of the present invention also provide exceptional properties of improved film clarity to the surface of a wood or plastic substrate when compared to prior aqueous coated compositions.

The present invention also provides aqueous coating compositions or formulations comprising the improved silica-based matting formulations of the invention, which compositions, upon drying, provide dried "clear coat" films having improved chemical resistance and film clarity. For purposes of the invention, the term "clear coat" film is used herein to indicate a film which is transparent or substantially transparent such that the natural grain or the color of a wood or plastic substrate is substantially visible to the human eye when applied onto at least one surface of a wood or plastic substrate. The coating compositions of the present invention provide films with improved chemical resistance and/or film clarity when compared to known coatings/films that do not contain the silica-based matting formulations of the present invention.

The present invention is further directed to methods of making the silica-based matting formulations and methods of preparing aqueous coating compositions comprising the matting formulations of the invention. The present invention is also directed to methods of coating a substrate with the herein-mentioned aqueous coating compositions. In a preferred embodiment, the substrate is a wood or plastic substrate.

The present invention is even further directed to methods of using the herein-described silica-based matting formulations. In some embodiments, the method of using the herein-described silica-based matting formulations comprises a method of improving the chemical resistance and/or film clarity, or any combination thereof, of a substrate, in particularly a wood or plastic substrate, wherein the method comprises incorporating the herein-described silica-based matting formulations into an aqueous coating composition prior to applying the coating composition onto the substrate. Unexpectedly, the herein-described coating compositions provide improved protection to a given wood or plastic substrate, when compared to known liquid coating compositions as measured using a colorimeter (e.g., a portable Spectro-Guide 45/0 colorimeter).

The present invention is even further directed to clear coat films formed with aqueous compositions containing the herein-described silica-based matting formulations, and substrates coated with aqueous compositions containing the herein-described silica-based matting formulations. In some exemplary embodiments, the substrate comprises a wood or plastic substrate coated with aqueous compositions containing the herein-described silica-based matting formulations.

These and other features and advantages of the present invention will become apparent after a review of the following detailed description of the disclosed embodiments and the appended claims.

BRIEF DESCRIPTION OF THE FIGURE

The present invention is further described with reference to the appended FIGURE, wherein:

FIG. 1 depicts a plot of chemical damage and weight percent matting formulation requirements of films containing exemplary matting formulations of the present invention versus the amount of low pore volume particles and the amount of high pore volume particles within matting formulations used to form the films.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a coated particle and/or composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or blend, and amounts that differ due to mixing or processing a formulation with a particular initial concentration or blend. Whether modified by the term "about", the claims appended hereto include equivalents.

As used herein, the term "blend" means homogenous or substantially homogeneous physical mixtures of two different sets of silica particles having two different pore volumes.

As used herein, the term "crystalline" means a solid material whose constituent atoms, molecules, or ions are arranged in an ordered pattern extends in all three directions, which may be measured by X-ray diffraction or differential scanning calorimetry. As used herein, the term "amorphous" means a solid material whose constituent atoms, molecules, or ions are arranged in a random, non-ordered pattern extends in all three directions, which may be determined by X-ray diffraction or differential scanning calorimetry.

As used herein, the term "silica-based matting formulations" refers to porous silica particles and/or silica/wax composite particles that are used as matting formulations in coating formulations of the invention. The porous silica particles may be silica gel, precipitated silica or fumed silica particles. The silica gel and precipitated silica may be made from sodium silicate and an acid such as sulfuric acid. The processes for the making of these particles are well known in the art, and most of these particles are commercially available from companies like W. R. Grace & Co., or Evonik, or other suppliers. Fumed silica may be made from flame pyrolysis of silicon tetrachloride or from quartz sand vaporized at high temperature. Many fumed silicas are commercially available from global producers such as Evonik, Cabot Corporation, Wacker Chemie, or Dow Corning, As used herein, the phrase "silica/wax composite particles" refers to low pore volume silica particles and/or high pore volume silica particles with one or more waxes in an amount sufficient to at least partially fill pores of the low pore volume silica particles, the high pore volume silica particles, or both the low pore volume silica particles and the high pore volume silica particles, resulting in reduced pore volumes of the original silica particles.

As used herein, "reduced pore volume" refers to the pore volume of silica particles that have been treated and/or coated and/or impregnated with a material (e.g., a wax) such that the resulting pore volume is less than the pore volume of the silica particles prior to the treatment and/or coating and/or impregnation.

As used herein, the term "BET particle surface area" is defined as meaning a particle surface area of porous silica particles or silica/wax composite particles as measured by the Brunauer Emmet Teller (BET) nitrogen adsorption method. The term "final BET particle surface area" refers to the particle surface area of silica/wax composite particles, following treatment/coating/impregnation of wax into the porous silica particles, as measured by the BET nitrogen adsorption method.

As used herein, the phrase "pore volume" refers to the median pore volume of a plurality of particles (i.e., any particles, including low pore volume silica particles, high pore volume silica particles, silica/wax composite particles, or any combination thereof) as determined using the Barrett-Joyner-Halenda (BJH) nitrogen porosimetry as described in DIN 66134 (i.e., determination of the pore size distribution and the specific surface area of mesoporous solids by means of nitrogen sorption—Method of Barrett, Joyner and Halenda (BJH)).

As used herein, the phrase "median pore volume" refers to a pore volume size (V50, which is a pore volume distribution of various particles with 50 volume percent of the particles pore volume is smaller than this number and 50 volume percent of the particles pore volume is larger than this number in size) measured by Barrett-Joyner-Halenda (BJH) nitrogen porosimetry as described in DIN 66134.

As used herein, the phrase "porous silica particles" refers to silica particles having a pore volume equal to or greater than 0.01 cc/g as determined by the Barrett-Joyner-Halenda (BJH) method.

As used herein, the phrase "low pore volume silica particles" or "LPV silica particles" refers to silica porous particles or silica/wax composite particles having a pore volume equal to or less than 0.80 cc/g (i.e., as low as 0.01 cc/g) as determined by the Barrett-Joyner-Halenda (BJH) method.

As used herein, the phrase "high pore volume silica particles" or "HPV silica particles" refers to porous silica particles or silica/wax composite particles having a pore volume of greater than 0.80 cc/g as determined by the Barrett-Joyner-Halenda (BJH) method.

As used herein, the phrase "particle size" refers to median particle size (D50, which is a volume distribution of various particles with 50 volume percent of the particles are smaller than this number and 50 volume percent of the particles are larger than this number in size) measured by dynamic light scattering when the particles are slurried in water or an organic solvent such as acetone or ethanol, or a surfactant such as Igepal® CA-630.

For purposes of this invention, the gloss values recited herein were measured when drawdowns of the aqueous coating compositions were carried out on a plain, smooth and non-penetrating black chart paper and dried at least for four (4) days at room temperature using Procedure 4 described in the examples below. All chemical resistance and film clarity values were also based on measurements on the black chart papers using Procedure 4 described in the examples below.

As used herein, the phrase "chemical resistance" refers to the ability (or inability) of a film to withstand degradation when exposed to a 50 v/v % ethanol in water solution using a test method as outlined in European standard specifications EN 12720DIN 68861-1, and as described using Procedure 4 described in the examples below. The "chemical resistance" of a given film may be indicated by (1) using a 1 to 5 scale outlined in EN 12720/DIM 68861-1 when the film is applied onto a substrate such as wood, plastic, or a black chart paper, or (2) measuring a 50/50 water/ethanol damage 1 hr $\Delta L^*$ value, measured using a portable Spectro-Guide 45/0 colorimeter, when the film is applied onto a plain, smooth and non-penetrating black chart paper and dried.

The present invention is directed to improved silica-based matting formulations that provide improved chemical resistance in films resulting from the application of an aqueous coating composition onto a substrate, preferably a wood or plastic substrate. Typically, the improved silica-based matting formulations comprise a blend of: (a) low pore volume silica particles having a pore volume equal to or less than 0.80 cc/g as determined by Barrett-Joyner-Halenda (BJH) method, and (b) high pore volume silica particles having a median pore volume of greater than 0.80 cc/g as determined by the BJH method.

Typically, the pore volume of the low pore volume silica particles is at least 0.10 cc/g less (e.g., 0.20 cc/g, 0.25 cc/g, 0.30 cc/g, etc.) than the pore volume of the high pore volume silica particles. In some embodiments, the median pore volume of the low pore volume silica particles is at least 0.20 cc/g less than the median pore volume of the high pore volume silica particles. In some embodiments, the median pore volume of the low pore volume silica particles is at least 0.50 cc/g less than the median pore volume of the high pore volume silica particles. In some embodiments, the pore volume of the low pore volume silica particles is at least 0.80 cc/g less than the pore volume of the high pore volume silica particles. In some embodiments, the pore volume of the low pore volume silica particles is at least 1.10 cc/g less than the pore volume of the high pore volume silica particles.

The low pore volume silica particles may have any pore volume equal to or less than 0.80 cc/g, in increments of 0.01 cc/g. In some embodiments, the low pore volume silica particles have a pore volume equal to or less than 0.79 cc/g (or 0.78 cc/g, 0.77 cc/g, etc.). In some embodiments, the low pore volume silica particles have a pore volume ranging from about 0.01 cc/g to about 0.79 cc/g (or any range of values between 0.01 cc/g and 0.79 cc/g, in increments of 0.01 cc/g, e.g., from about 0.010 cc/g to about 0.50 cc/g) as determined by the BJH method. In other embodiments, the low pore volume silica particles have a pore volume ranging from about 0.01 cc/g to about 0.60 cc/g as determined by the BJH method.

The high pore volume silica particles may have any pore volume greater than 0.80 cc/g, in increments of 0.01 cc/g. In some embodiments, the high pore volume silica particles have a pore volume equal to or greater than 0.81 cc/g (or 0.82 cc/g, 0.83 cc/g, etc.). In some embodiments, the high pore volume silica particles have a median pore volume ranging from about 0.80 cc/g to about 2.40 cc/g (or any range of values between 0.80 cc/g and 2.40 cc/g, in increments of 0.01 cc/g, e.g., from about 1.00 cc/g to about 2.00 cc/g) as determined by the BJH method. In other embodiments, the high pore volume silica particles have a median pore volume ranging from 0.90 cc/g to about 2.00 cc/g as determined by Barrett-Joyner-Halenda (BJH) method.

In some desired embodiments, the matting formulation of the invention comprises a blend of high pore volume silica particles and low pore volume silica particles, wherein both of the high pore volume silica particles and the low pore volume silica particles consist essentially of silica. As used herein, the phrase "consist essentially of silica" refers to high pore volume silica particles and low pore volume silica particles that do not contain any wax within the pores of the high pore volume silica particles and the low pore volume silica particles.

In some desired embodiments, the matting formulation of the invention comprises (1) a blend of: (a) the low pore volume silica particles, and (b) the high pore volume silica particles, with (2) one or more waxes at least partially filling pores of at least a portion of, or all of, the particles within the blend so that at least a portion of, or all of, the particles within the blend comprise silica/wax composite particles. In some embodiments, at least a portion of, or all of, the low pore volume silica particles of a given blend comprise silica/wax composite particles. In some embodiments, at least a portion of, or all of, the high pore volume silica particles of a given blend comprise silica/wax composite particles. In some embodiments, at least a portion of, or all of, the low pore volume silica particles and the high pore volume silica particles of a given blend comprise silica/wax composite particles.

In some embodiments, the low pore volume silica particles of a given blend further comprise one or more first waxes in an amount sufficient to at least partially fill pores of the low pore volume silica particles. In some embodiments, the low pore volume silica particles of a given blend have an initial pore volume of 0.80 cc/g, or greater than 0.80 cc/g, prior to the one or more first waxes at least partially filling pores of the low pore volume silica particles. In other embodiments, the low pore volume silica particles of a given blend have an initial pore volume of less than 0.80 cc/g prior to the one or more first waxes at least partially filling pores of the low pore volume silica particles.

In some embodiments, the low pore volume silica/wax composite particles of a given blend comprise from about 5.0 wt % to less than about 65.0 wt % of the one or more first waxes, based on a total weight of the low pore volume silica/wax composite particles. In other embodiments, the low pore volume silica/wax composite particles of a given blend comprise from about 10.0 wt % to less than about 60.0 wt % of the one or more first waxes, based on a total weight of the low pore volume silica/wax composite particles. In yet other embodiments, the low pore volume silica/wax composite particles of a given blend comprise from about 15.0 wt % to less than about 55.0 wt % of the one or more first waxes, based on a total weight of the low pore volume silica/wax composite particles.

In some embodiments, the high pore volume silica/wax composite particles of a given blend comprise one or more second waxes in an amount sufficient to at least partially fill pores of the high pore volume silica particles. In some embodiments, the high pore volume silica/wax composite particles of a given blend comprise from about 5.0 wt % to less than about 65.0 wt % of the one or more second waxes, based on a total weight of the high pore volume silica/wax composite particles. In other embodiments, the high pore volume silica/wax composite particles of a given blend comprise from about 10.0 wt % to less than about 60.0 wt % of said one or more second waxes, based on a total weight of said high pore volume silica/wax composite particles. In yet other embodiments, the high pore volume silica/wax composite particles of a given blend comprise from about 15.0 wt % to less than about 55.0 wt % of the one or more second waxes, based on a total weight of the high pore volume silica/wax composite particles.

Suitable porous silica particles useful as matting formulations of the present invention, both (i) without any wax and (ii) used in the preparation of silica/wax composite particles, include, but are not limited to, silica gel, precipitated silica, fumed silica particles. Suitable porous silica particles useful as matting formulations of the present invention, both (i) without any wax and (ii) used in the preparation of silica/wax composite particles, also include, but are not limited to, ordered mesoporous silica particles prepared through an organic template (e.g., a surfactant) during the formation of silica particles, followed by a high temperature treatment to "burn off" the organics. Particularly preferred porous silica particles useful as matting formulations of the present invention, both (i) without any wax and (ii) used in the preparation of silica/wax composite particles, comprise silica gel or precipitated silica particles.

Preferred porous silica particles useful as matting formulations of the present invention, both (i) without any wax and (ii) used in the preparation of silica/wax composite particles, include, but are not limited to, silica gels or precipitated silicas having initial BJH pore volumes of less than or equal to 2.5 cc/g, and in some embodiments, between about 0.01 cc/g up to about 2.5 cc/g. Commercially available porous silica particles useful in the present invention include particles available from W.R. Grace (Columbia, MD) under the trade designation SYLOID® such as SYLOID® C807 silica gel particles and SYLOID® MX106 precipitated silica particles, SYLOBLOC® silica gel particles, and DARA-CLAR® silica gel particles.

In a preferred embodiment, the porous silica particles useful as matting formulations of the present invention, both (i) without any wax and (ii) used in the preparation of silica/wax silica/wax composite particles, comprise porous silica particles having a purity of at least about 93.0% by weight $SiO_2$, or at least about 93.5% by weight $SiO_2$, at least about 94.0% by weight $SiO_2$, at least about 95.0% by weight $SiO_2$, at least about 96.0% by weight $SiO_2$, at least about 97.0% by weight $SiO_2$, or at least about 98.0% by weight $SiO_2$ up to 100% by weight $SiO_2$ based upon the total weight of the porous silica particle.

The porous silica particles useful as matting formulations of the present invention, both (i) without any wax and (ii) used in the preparation of silica/wax composite particles, may have a variety of different symmetrical, asymmetrical or irregular shapes, including chain, rod or lath shape. The porous silica particles may have different structures including amorphous or crystalline, etc. In a preferred embodiment, the porous silica particles are amorphous. The porous silica particles may include blends of particles comprising different compositions, sizes, shapes or physical structures, or that may be the same except for different surface treatments. Porosity of the porous silica particles may be intraparticle or interparticle in cases where smaller particles are agglomerated to form larger particles.

The porous silica particles or silica/wax composite particles useful as matting formulations of the present invention silica/wax composite silica/wax composite typically have a BET particle surface area of from greater than 0.0 m$^2$/g to less than 1000.0 m$^2$/g (or any range of values between 0 m$^2$/g and less than 1000.0 m$^2$/g, in increments of 0.1 m$^2$/g, e.g., from about 0.1 m$^2$/g to about 999.9 m$^2$/g). In some embodiments, the silica particles and/or silica/wax composite particles have a final BET particle surface area of from about 1.0 m$^2$/g up to about 800.0 m$^2$/g (or any range of values between 1.0 m$^2$/g and 800.0 m$^2$/g, in increments of 0.1 m$^2$/g, e.g., from about 1.1 m$^2$/g to about 799.9 m$^2$/g). In other embodiments, the silica and/or silica/wax composite particles used to form the matting formulations of the present invention have a BET particle surface area of from about 25.0 m$^2$/g up to about 700.0 m$^2$/g.

The matting formulations of the present invention typically have a median particle size of from about 1.0 micron (μm) to about 50.0 μm (or any range of values between and including 1.0 μm up to about 50.0 μm, in increments of 0.1 μm, e.g., from about 39.2 μm to about 49.1 μm). However, it should be understood that the matting formulations of the present invention may have any median particle size depending on the use of the particles. In some embodiments, the matting formulations of the present invention have a median particle size of from about 2.0 μm to about 20.0 μm. In some embodiments, the matting formulations of the present invention have a median particle size of from about 3.0 μm to about 15.0 μm.

Each of the one or more first and second waxes, when present, may independently comprise, but is not limited to, a hydrocarbon wax (i.e., a wax comprising relatively long alkyl chains, e.g., alkyl chains having 20 or more carbon atoms therein, with or without one or more various functional groups such as fatty acids, primary and secondary long chain alcohols, unsaturated bonds, aromatics, amides, ketones, and aldehydes), a paraffin wax (i.e., from 20-40 carbon atoms without additional functional groups), a polyethylene wax, a polypropylene wax, a plant wax such as a carnauba wax (i.e., Brazil wax), an animal wax such as bee wax, or any combination thereof.

Commercially available waxes that are suitable for use in the present invention include, but are not limited to, waxes available from Mitsui Chemicals, LLC (Osaka, Japan) under the trade designations Hi-WAX™ or EXCEREX™ waxes, waxes available from Honeywell Performance Additives (Morristown, NJ) under the trade designations RHEOLUB® waxes; and waxes available from TH.C.TROMM GmbH (Cologne, Germany) under the trade designations POLAR-WACHS® waxes.

In some embodiments, the matting formulation comprise a blend of low pore volume silica particles and high pore volume silica particles, wherein at least a portion of the particles are silica/wax composite particles that comprise porous silica particles (e.g., low pore volume silica particles and/or high pore volume silica particles) with a polyethylene wax, a polypropylene wax, or a combination thereof. In some desired embodiments, the composite particles comprise a polyethylene wax having an average molecular weight of at least 2000. Such a relatively high molecular weight polyethylene wax is commercially available from TH.C.TROMM GmbH (Cologne, Germany) under the trade designations POLARWACHS® wax.

In some desired embodiments, the composite particles, when present, comprise the above-described one or more first waxes and the one or more second waxes, and both of the above-described one or more first waxes and the one or more second waxes comprises the same one or more waxes.

To form silica/wax composite particles, the porous silica particles (e.g., low pore volume silica particles and/or high pore volume silica particles) are treated with one or more waxes in an amount sufficient to provide silica/wax composite particles having the desired low or high pore volume as defined above and as determined by the BJH method. Typically, the silica/wax composite particles comprise from about 5.0 wt % to about 65.0 wt % of one or more waxes (i.e., one or more first or second waxes), based on a total weight of the silica/wax composite particles, as described herein above. Typically, the one or more waxes (i.e., one or more first or second waxes) is coated onto the porous silica particles in any amount sufficient to partially or substantially fill the pores of the porous silica particles so as to provide the desired low or high pore volume in the silica/wax composite particles, but not too much such that the one or more waxes fill the pores of the porous silica particles and start to accumulate along the outer surface of the resulting silica/wax composite particles.

Silica/wax composite particles useful in the present invention may be prepared by contacting the porous silica particles with one or more waxes (i.e., one or more first or second waxes) in a manner sufficient to provide composite particles having (i) a desired pore volume of equal to or less than 0.80 cc/g or greater than 0.80 cc/g as determined by the BJH method, and (ii) from about 5.0 wt % to about 65.0 wt % (more typically, from about 10.0 wt % to about 60.0 wt %, even more typically, from about 15.0 wt % to about 55.0 wt %), based on a total weight of the silica/wax composite particles, of one or more waxes (i.e., one or more first or second waxes) at least partially within pores of the porous silica particles. Any conventional method may be used to contact the porous silica particles with one or more waxes so as to provide the silica/wax composite particles. In some embodiments, the contacting step may be a wet process. The wet contacting process step may comprise dissolving or dispersing the one or more waxes in a solvent to form a solvent mixture; incorporating the porous silica particles into the solvent mixture; and removing or evaporating the solvent from the solvent mixture, to form the silica/wax composite particles.

The silica/wax composite particles may thereafter be subjected to size reduction. Any known method of reducing the particle size may be used to reduce the particle size of the silica/wax composite particles, the low pore volume silica particles, and/or the high pore volume silica particles, and include, but are not limited to, a milling step such as ball mill or a mortar pestle grinding step. In one embodiment, the silica/wax composite particles are subjected to a size reduction step, wherein the median particle size of the silica/wax composite particles is reduced to a first median particle size of less than about 500 microns (μm). Once reduced in size, the silica/wax composite particles are desirably heat treated at an elevated temperature for a heat treatment period of time. Typically, the elevated temperature is from about 90° C. to about 140° C. (or any range of values between 90° C. up to and including 140° C., in increments of 1.0° C., for example, from about 91.0° C. to about 102.0° C.). Typically, the heat treatment period of time ranges from about 1.0 hour (hr) to about 4.0 hr (or any range of values between 1.0 hr up to and including 4.0 hr, in increments of 1.0 minute, for example, from about 1.0 hr and 9 minutes to about 2.0 hr and 5 minutes).

In one exemplary heat treatment step for forming silica/wax composite particles of the present invention, the elevated temperature of the heat treatment step ranges from about 100° C. to about 130° C., and the heat treatment period of time ranges from about 1.0 hr to about 1.5 hr.

Following any optional heat treatment step, the heat-treated silica/wax composite particles are allowed to cool. Once cooled, the heat-treated silica/wax composite particles may optionally be further reduced in size so as to result in a final particle size of less than about 100.0 μm (or any range of values between about 1.0 μm up to and including 100.0 μm, in increments of 1.0 μm, for example, from about 4.0 μm to about 6.7 μm). As discussed above, any known method of reducing particle size may be used. In one exemplary embodiment, a milling step may be utilized so as to result in silica/wax composite particles having a final particle size of less than about 45.0 μm.

In other exemplary embodiments, the contacting step may not involve any solvent and therefore be a dry process. In one embodiment, the dry process may comprise melting the one or more waxes (i.e., one or more first or second waxes) to form a molten liquid; and incorporating the porous silica particles into the molten liquid, followed by particle size reduction. In yet other embodiments, the dry process may comprise simultaneously contacting and mixing (a) the one or more waxes, and (b) the porous silica particles in a conventional mixer such as a ribbon blender, a Henschel mixer, a twin screw extruder, a fluid energy mill (FEM) or a micronizing jet mill at high temperature (i.e., a temperature that melts any waxes if needed). In these embodiments, the heating and particle size reduction steps are combined and additional particle size reduction may or may not be necessary.

Although the above-described low pore volume silica or silica/wax composite particles and high pore volume silica or silica/wax composite particles may be present in any amount within a given blend, typically, the low pore volume silica or silica/wax composite particles are present within a given blend in an amount of from about 1.0 weight percent (wt %) to about 99.0 wt %, and the high pore volume silica or silica/wax composite particles are present in an amount of from about 99.0 wt % to about 1.0 wt %, based on a total weight of the blend. In some embodiments, the low pore volume silica or silica/wax composite particles are present within a given blend in an amount of from about 50.0 wt % to about 98.0 wt %, and the high pore volume silica or silica/wax composite particles are present in an amount of from about 50.0 wt % to about 2.0 wt %, based on a total weight of the blend. In other embodiments, the low pore volume silica or silica/wax composite particles are present within a given blend in an amount of from about 60.0 wt % to about 95.0 wt %, and the high pore volume silica or silica/wax composite particles are present in an amount of from about 40.0 wt % to about 5.0 wt %, based on a total weight of the blend.

Coating Compositions

The matting formulations of present invention (i.e., the herein described blend of low pore volume silica particles and high pore volume silica particles) are useful to prepare coating compositions comprising aqueous suspensions or dispersions of the herein-described silica-based matting formulations. In a preferred embodiment, the coating composition is a waterborne or aqueous coating composition, which generally yields a clear coat film upon drying on a substrate. When the substrate is wood, the clear coat film allows the natural color and grain structure of wood, such as, teak, cherry, oak, walnut, mahogany and rose wood, to be visible or substantially visible to the eye, which characteristic may be highly prized in applications, such as, furniture and wood carvings.

The coating compositions may comprise the disclosed silica-based matting formulations (i.e., the herein described blend of low pore volume silica particles and high pore volume silica particles) in addition to various other ingredients used in coating compositions. Examples of other ingredients that can be present in the compositions include, but are not limited to, an aqueous film-forming binder resin, such as a self-crosslinking modified acrylic copolymers emulsion or a latex acrylic binder NEOCRYL® XK12 (available from Royal DSM, Heerlen, the Netherlands), and a coalescent solvent such as dipropylene glycol n-butyl ether (DOWANOL™ PDnB). The composition may or may not contain color pigments such as organic pigments or titanium dioxide white inorganic pigments, provided that, where the substrate is wood, the natural grain of the word remains substantially visible to the eye. When the composition contains a color pigment, a dispersant may also be included in the formulation.

The balance of the composition is typically water. Other diluents can also be included, aside from water, including, but not limited to, aliphatics, aromatics, alcohols, ketones, white spirit, petroleum distillate, esters, glycol ethers, low-molecular weight synthetic resins, and the like. Environmentally friendly diluents, such as water, are preferred.

Other miscellaneous additives can also be included in the compositions, including without limitation, additives to modify surface tension, improve flow properties, improve finished appearance, increase wet edge, improve pigment stability, impart antifreeze properties, control foaming, control skinning, etc. Further additives that can be included in the compositions include without limitation surfactants, catalysts, thickeners, stabilizers, emulsifiers, texturizers, adhesion promoters, UV stabilizers, de-glossing formulations, biocides to fight bacterial growth, and the like. Oil can be included as a rheology formulation, gloss modifier and protective formulation that will reduce damage to the coating that would otherwise result from forming processes and from degrative elements in the service environment of the coated materials.

The coating compositions of the present invention typically comprise (I) up to about 16.0 wt % (or any range of values between 0.1 wt % up to and including 16.0 wt %, in increments of 0.1 wt %, for example, from about 7.5 to about 12.5 wt %) of the silica-based matting formulations (i.e., the herein described blend of low pore volume silica particles and high pore volume silica particles), and (II) about 84.0 wt % or more of one or more additional components, with both weight percentages of components (I) and (II) being based on a total weight of the coating composition.

In some desired embodiments, the coating compositions of the present invention comprise (I) from about 5.0 wt % up to about 15.0 wt % (or any range of values between 5.0 wt % up to and including 15.0 wt %, in increments of 0.1 wt %, for example, from about 6.8 to about 12.8 wt %) of the herein described blend of low pore volume silica particles and high pore volume silica particles, and (II) from about 95.0 wt % to about 85.0 wt % (or any range of values between 95.0 wt % up to and including 85.0 wt %, in increments of 0.1 wt %, for example, from about 96.2 to about 94.2 wt %) of one or more additional components, with both weight percentages of components (I) and (II) being based on a total weight of the coating composition.

Uses

The present invention is even further directed to the use of the silica-based matting formulations (i.e., the herein described blend of low pore volume silica particles and high pore volume silica particles) in various coating applications/processes. When used as a matting formulation in coating compositions, the herein-described silica particles provide improved chemical resistance in addition to other desirable properties such as improved thermal stress resistance, improved weather resistance, improved film clarity, or any combination thereof in the final coating.

In a preferred embodiment, the silica-based matting formulations of the invention (i.e., the herein described blend of low pore volume silica particles and high pore volume silica particles) are useful in methods of improving chemical resistance of a film resulting from an aqueous coating composition being applied to a substrate. In another embodiment, the silica-based matting formulations of the invention are useful in methods of improving chemical resistance simultaneously with improving film clarity of a clear coat film resulting from an aqueous film coating composition being applied to a substrate.

In a particularly preferred embodiment, the substrate is a wood subtrate. In one desired embodiment, a wood or plastic substrate is treated with an aqueous coating composition thereof, wherein the coating composition comprises the silica-based matting formulations of the invention (i.e., the herein described blend of low pore volume silica particles and high pore volume silica particles) on a surface of the wood or plastic substrate. Other substrates which may be coated with coating compositions in accordance with the present invention include, but are not limited to, leather, plastics (e.g., vinyl), metal (e.g., coil) or metal alloys, cement or concrete or other industrial finishes.

Generally, the method of utilizing a matting formulation in a coating composition in accordance with the invention comprises incorporating the inventive silica-based matting formulations (i.e., the herein described blend of low pore volume silica particles and high pore volume silica particles) into a coating composition, preferably an aqueous coating composition, prior to applying the coating composition onto the substrate. The typical incorporation step includes mixing or dispersing the silica-based matting formulations (i.e., the herein described blend of low pore volume silica particles and high pore volume silica particles) into the formulation. The method of applying the coating composition to a substrate includes brushing, rolling, air spraying, or a drawdown procedure, or other possible methods.

As discussed further in the examples below, incorporation of the silica-based matting formulation of the current invention (i.e., the herein described blend of low pore volume silica particles and high pore volume silica particles) into an aqueous coating composition and subsequently applying the coating composition onto a plain, smooth and non-penetrating black chart paper and dried, forms coated films with improved chemical resistance alone or in combination with improved film clarity at a 60° gloss value target (i.e., a 60° gloss value between about 3.0 and about 30.0 as measured using a portable Micro-TRI-Gloss meter) when compared to known coatings/films that do not contain the silica-based matting formulations of the present invention.

For example, in some embodiments, a coating composition comprising the silica-based matting formulations (i.e., the herein described blend of low pore volume silica particles and high pore volume silica particles) in an amount sufficient to achieve a 60° gloss value between 3.0 and 30.0 units, more preferably between 5.0 and 20.0 units, more preferably between 10.0 and 15.0 units (e.g., 12.5 units), when applied onto a plain, smooth and non-penetrating black chart paper and dried, results in a film, preferably a clear coat film, wherein the film exhibits a 50/50 water/ethanol damage 1 hr $\Delta L^*$ of less than 10.0 units (or any range of values less than 10.0 units, in increments of 0.1 units, for example, from about 2.5 units to about 7.0 units) as measured using a portable Spectro-Guide 45/0 colorimeter and the method described in the examples below. In some embodiments, a coating composition comprising the silica-based matting formulations of the invention (i.e., the herein described blend of low pore volume silica particles and high pore volume silica particles) in an amount sufficient to achieve a 60° gloss value between 3.0 and 30.0 units, more preferably between 5.0 and 20.0 units, more preferably between 10.0 and 15.0 units (e.g., 12.5 units), when applied onto a plain, smooth and non-penetrating black chart paper and dried, results in a film, preferably a clear coat film, wherein the film exhibits a 50/50 water/ethanol damage 1 hr $\Delta L^*$ of less than 7.0 units or less than 5.0 units or less than 3.0 units as measured using a portable Spectro-Guide 45/0 colorimeter and the method described in the examples below.

In some desired embodiments, films having a 60° gloss value between 3.0 and 30.0 units, more preferably between 5.0 and 20.0 units, more preferably between 10.0 and 15.0 units (e.g., 12.5 units), that exhibit the above mentioned improvements in chemical resistance when applied onto a plain, smooth and non-penetrating black chart paper and dried, also exhibit a film clarity ΔL* of less than 7.0 units (or any range of values less than 7.0 units, in increments of 0.1 units, for example, from about 1.2 units to about 5.0 units) as measured using a portable Spectro-Guide 45/0 colorimeter and the method described in the examples below. In some desired embodiments, films having a 60° gloss value between 3.0 and 30.0 units, more preferably between 5.0 and 20.0 units, more preferably between 10.0 and 15.0 units (e.g., 12.5 units), that exhibit one or more of the above mentioned improvements in chemical resistance when applied onto a plain, smooth and non-penetrating black chart paper and dried, also exhibit a film clarity ΔL* of less than 6.0 units (or less than 5.0 units, or less than 4.5 units) as measured using a portable Spectro-Guide 45/0 colorimeter and the method described in the examples below.

In some desired embodiments, a coating composition comprising the herein-described silica-based matting formulations (i.e., the herein described blend of low pore volume silica particles and high pore volume silica particles) in an amount sufficient to achieve a 60° gloss value of between 3.0 and 30.0 units, more preferably between 5.0 and 20.0 units, more preferably between 10.0 and 15.0 units (e.g., 12.5 units), in a dried film, results in a film, preferably a clear coat film, on a substrate, such as a wood substrate, a plastics substrate, or a black chart paper, that exhibits a chemical resistance visual rating (R) of from 3 to 5 within a scale of 1 to 5 used in the test method EN 12720 or DIN688861-1 (i.e., European standards for assessment of furniture surface resistance to cold liquids), with R values 1 to 5 represented by the following visual features:

5=no visible alteration (no damage)
  4=slight change in gloss or color or some isolated distinguishable surface marking
  3=slight marking visible from various viewing angles, e.g. a distinct circular line or area
  2=strong marking, the surface structure is however largely undamaged
  1=strong marking, the surface structure is damaged or the coating material is completely or partially destroyed or the filter-paper is stuck on the surface.

When the coating is applied onto black chart paper, and the binder system is an acrylic binder system, NEOCRYL® XK12 (available from Royal DSM, Heerlen, the Netherlands)), the R value 1 to 5 of the above-referenced scale of the EN 12720/DIN 68861-1 test method can be converted into an approximate ΔL value (i.e., a 50/50 water/ethanol damage 1 hr ΔL* as measured using a portable Spectro-Guide 45/0 colorimeter and the method described in the examples below), and vice versa, using the rating conversion equation:

$$R=(24-\Delta L)/4.8.$$

In some desired embodiments, a coating composition comprising the herein-described silica-based matting formulations (i.e., the herein described blend of low pore volume silica particles and high pore volume silica particles) in an amount sufficient to achieve a 60° gloss value of between 3.0 and 30.0 units, more preferably between 5.0 and 20.0 units, more preferably between 10.0 and 15.0 units (e.g., 12.5 units), when applied onto a plain, smooth and non-penetrating black chart paper and dried, forms a film that exhibits one or more or all of: (a) a 50/50 water/ethanol damage 1 hr ΔL* of less than 10.0 units (or any range of values less than 10.0 units, in increments of 0.1 units, for example, from about 2.5 units to about 8.0 units) as measured using a portable Spectro-Guide 45/0 colorimeter and the method described in the examples below; (b) a chemical resistance rating (R) of from 3 to 5 within a scale of 1 to 5 using test method EN 12720/DIN 68861-1; and (c) a film clarity ΔL* of less than 7.0 units (or less than 6.0 units, or less than 5.0 units, or less than 4.5 units) as measured using a portable Spectro-Guide 45/0 colorimeter and the method described in the examples below.

In some desired embodiments, a coating composition comprising the herein-described silica-based matting formulations (i.e., the herein described blend of low pore volume silica particles and high pore volume silica particles) in an amount sufficient to achieve a 60° gloss value of between 3.0 and 30.0 units, more preferably between 5.0 and 20.0 units, more preferably between 10.0 and 15.0 units (e.g., 12.5 units), when applied onto a plain, smooth and non-penetrating black chart paper and dried, forms a film that exhibits one or more or all of: (a) a 50/50 water/ethanol damage 1 hr ΔL* of less than 8.0 units (or any range of values less than 8.0 units, in increments of 0.1 units, for example, from about 2.5 units to about 7.5 units) as measured using a portable Spectro-Guide 45/0 colorimeter and the method described in the examples below; (b) a chemical resistance rating (R) of from 3 to 5 within a scale of 1 to 5 using test method EN 12720/DIN 68861-1; and (c) a film clarity ΔL* of less than 6.0 units (or less than 5.0 units, or less than 4.5 units) as measured using a portable Spectro-Guide 45/0 colorimeter and the method described in the examples below.

In some desired embodiments, a coating composition comprising the herein-described silica-based matting formulations (i.e., the herein described blend of low pore volume silica particles and high pore volume silica particles) in an amount sufficient to achieve a 60° gloss value of between 3.0 and 30.0 units, more preferably between 5.0 and 20.0 units, more preferably between 10.0 and 15.0 units (e.g., 12.5 units), when applied onto a plain, smooth and non-penetrating black chart paper and dried, forms a film that exhibits one or more or all of: (a) a 50/50 water/ethanol damage 1 hr ΔL* of less than 6.0 units (or any range of values less than 6.0 units, in increments of 0.1 units, for example, from about 2.5 units to about 5.8 units) as measured using a portable Spectro-Guide 45/0 colorimeter and the method described in the examples below; (b) a chemical resistance rating (R) of from 3 to 5 within a scale of 1 to 5 using test method EN 12720/DIN 68861-1; and (c) a film clarity ΔL* of less than 5.0 units (or less than 4.5 units) as measured using a portable Spectro-Guide 45/0 colorimeter and the method described in the examples below.

In some desired embodiments, a coating composition comprising the herein-described silica-based matting formulations (i.e., the herein described blend of low pore volume silica particles and high pore volume silica particles) in an amount sufficient to achieve a 60° gloss value of between 3.0 and 30.0 units, more preferably between 5.0 and 20.0 units, more preferably between 10.0 and 15.0 units (e.g., 12.5 units), when applied onto a plain, smooth and non-penetrating black chart paper and dried, forms a film that exhibits one or more or all of: (a) a 50/50 water/ethanol damage 1 hr ΔL* of less than 4.0 units (or any range of values less than 4.0 units, in increments of 0.1 units, for example, from about 2.5 units to about 3.8 units) as measured using a portable Spectro-Guide 45/0 colorimeter and the method described in the examples below; (b) a chemical resistance rating (R) of from 3 to 5 within a scale of 1 to 5 using test method EN 12720/DIN 68861-1; and (c) a film clarity ΔL* of less than 4.5 units as measured using a portable Spectro-Guide 45/0 colorimeter and the method described in the examples below.

While not wishing to be bound by any particular theory, it is hypothesized that the improved properties of chemical resistance attributable to the improved silica-based matting formulations, and resulting compositions and films, may be due to one or more of the following factors: 1) the coated wax, when present, at least partially fill the pores of the porous silica particles and which provides a reduction of particle shrinkage during exposure to the solvent and drying; 2) the coated wax leads to improved adhesion between matting particle and the latex; 3) the coated wax, when present, has the ability for wax coating to better flow and fill in cracks as they form; 4) the coated wax, when present, leads to reduced stress on the latex-particle interface due to the softening of the latex in the region surrounding the particle, 5) diffusion of the wax, when present, into at least some of the pores of the film, thereby reducing penetration of water, ethanol or other solvent into the film, and 6) the coated wax, when present, at least partially fills the pores of the porous silica particles but is not in excess so as to further coat the outer surface of the porous silica particles.

While not wishing to be bound by any particular theory, it is believed that given the same particle size, high pore volume particles (i.e., highly porous particles) are much more efficient in creating matting effect in coated films created from a coating formulation containing such particles. However, highly porous particles are prone to shrinkage upon exposed to solvents such as water, and then dried, due to capillary forces of the solvent and these shrinkages would result in "gaps" between the particles and the polymeric binders that are connected with the particles in a dried film. The gaps would scatter light and create visual defects for such films. On the other hand, low pore volume or less porous particles, while not as efficient in creating matting effect, have less tendency to shrink.

And thus the blending of the high pore volume and low pore volume particles in a coating formation would provide the resulting films with both the desired matting efficiency and improved chemical resistance.

It should be understood that although the above-described silica-based matting formulations (i.e., the herein described blend of low pore volume silica particles and high pore volume silica particles), methods and uses are described as "comprising" one or more components or steps, the above-described silica particles, methods and uses may "comprise," "consists of," or "consist essentially of" any of the above-described components or steps of the silica particles, methods and uses. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a silica-based matting formulation, method and/or use that "comprises" a list of elements (e.g., components or steps) is not necessarily limited to only those elements (or components or steps), but may include other elements (or components or steps) not expressly listed or inherent to the silica-based matting formulation, method and/or use.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define silica-based matting formulations, methods and/or uses that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe (i) processes in accordance with the present invention for preparing silica-based particles, (ii) the evaluation of the silica-based particles and the blending of the particles in coating compositions, and (iii) the results from these evaluations.

In examples described herein, matting formulations consisted of silica particles, or silica/wax composites, or wax particles. These silica particles could be silica gel, precipitated silica, and fumed silica. The preparation of these particles was well known in the art. These silica particles are in general commercially available from various suppliers, such as W. R. Grace & Co. (Columbia, MD, USA), or Evonik Industries AG (Essen, Germany). Wax based matting formulations were also commercially available, for example, CERAFLOUR® 929 (C929) could be purchased from BYK USA Inc. (Wallingford, CT, USA).

The particle sizes reported in the Examples were determined by light scattering using a Malvern Mastersizer 3000 available from Malvern Instruments Ltd. per ASTM B822-10. Median particle sizes (D50) were reported. The D50 is the size in microns that splits the volume distribution with half above and half below this value.

Coating formulations, draw down procedures and gloss (Matting efficiency), and chemical resistance measurement methods used in the Examples below were described as follows. Also, the preparation of silica/wax composites, as well as the procedure of measuring pore volumes of the particles were depicted.

19

Procedure 1—Formation of a Stock Solution for Testing of Coating Compositions

The components listed in Table 1 below were combined as described below to form a stock solution for testing coating compositions as discussed below.

TABLE 1

| Stock Solution for Testing of Coating Compositions | | | |
|---|---|---|---|
| Raw Material | Supplier | Weight (g) | Comments |
| NEOCRYL ® KX12 | DSM | 77.43 | Acrylic Emulsion |
| Deionized Water | | 11.07 | |
| DOWANOL ™ PDnB | Dow Chemical | 8.85 | Coalescent |
| BYK ® 024 | BYK | 0.55 | Defoamer |
| SURFYNOL ® 104E | Air Products | 1.11 | Wetting and Defoamer |
| RHEOLATE ® 299 | Elementis | 0.22 | Rheolate |
| BYK ® 346 | BYK | 0.77 | |

77.43 grams (g) of NEOCRYL® KX12 and 5.53 g of deionized water were mixed in a first container. 8.85 g of DOWANOL™ PDnB and 5.54 g of deionized water were mixed in a second container. Then, the contents of the second container were slowly poured into the first container. The mixture was dispersed at 1500 rpm for 15 minutes using a DISPERMAT® disperser from Gardner Company (Pompano Beach, FL) with a 30 mm wide blade.

0.55 g of BYK® 024, 1.11 g of SURFYNOL® 104E and 0.22 g of RHEOLATE® 299 were added to the mixture in the first container. The mixture was then dispersed at 2500 rpm for 10 minutes using the DISPERMAT® disperser.

0.77 g of BYK® 346 was added to the mixture in the first container. The mixture was then dispersed at 1000 rpm for 5 minutes using the DISPERMAT® disperser. The resulting mixture then was used as a stock solution, capable of being stored for up to 1 month.

Procedure 2—Formation of Coating Compositions Comprising a Matting Formulation and the Stock Solution Coating compositions comprising a matting formulation and the stock solution of Procedure 1 were prepared as follows. The goal of using matting formulations was to lower the gloss of the coated film, and a target 60° gloss range of between 10.0 and 15.0, or close to 12.5. To achieve this level of gloss, the required amounts of matting formulations varied for different samples and were determined from a separate loading versus gloss study, and the plots of the results from such studies were often called matting curves. After these studies, loading levels for certain matting formulations to reach a gloss of 12.5 were calculated. Given amounts of matting formulation or mixtures of two matting formulations were added into a given amount of stock solution formed in Procedure 1 above, the resulting mixture was dispersed at 2500 rpm for 30 min using the DISPERMAT® disperser, and then allowed to sit overnight at room temperature.

Drawdowns for testing each coating composition were carried out the second day (i.e., the day after making a given coating composition) using the drawdown procedure described above.

Procedure 3—Drawdown Procedure and Drawdown Cards

Drawdowns were carried out with a wire wound lab rod from Gardner Company with wire size of 40. With this size, the wet film thickness was about 100 μm. After drying, the dry film thickness was around 30-35 μm. The drawdown plates used were 219×286 mm² plain black chart papers from Leneta Company, Inc. (Mahwah, NJ). The procedure for each drawdown was as follows:

1. In a dust free clean room, a blank drawdown plate was placed on a vacuum holder.
2. Using a pipette, about 2-5 ml of a well-mixed coating composition sample was positioned on and near the top of a sample sheet.
3. The ends of the drawdown rod were immediately grasped. Using the thumbs of both hands to keep the rod from bowing or bending away from the sample, the drawdown rod was drawn down through the liquid pool, spreading and metering the fluid across the sample sheet. After a given drawdown was made, the drawdown rod was immersed in a cleaning tray after use.
4. After the drawdown, the drawdown samples were left at room temperature for at least four days to allow complete drying of the coated layer.
5. After the coated drawdown plate was dry, chemical resistance, film clarity, matting efficiency and cold check tests were carried out using the procedures below.

Procedure 4—Gloss (Matting Efficiency), Film Clarity and Chemical Resistance Measurement and Test Methods A portable Micro-TRI-Gloss meter (from BYK-Gardner USA, Columbia, MD) was used for film gloss reading. 60° gloss values were measured and reported.

For film clarity and chemical damage check (i.e., ΔL described below), a portable Spectro-Guide 45/0 colorimeter (also from BYK-Gardner) was used. The L* values were obtained by readings of the colorimeter on a given coated film. On the card with black background, unmatted stock solution gave an L* value of around 7.9. The addition of a matting formulation (e.g., silica) in the stock solution made the film whiter (i.e., resulting in a higher L* value) and the film clarity matted film was defined as the difference between the new L* value and the L* value from the film formed out of the stock solution containing no matting formulation. For chemical damage check, the L* values were obtained by readings of the colorimeter on a given coated film. Chemical Resistance test methods used as described in European standard specifications EN 12720/DIN 68861-1. Resistances towards 50 v/v % ethanol in water was tested. The test was carried out as follows:

1. Drawdowns were carried out as described in Procedures 2 and 3. After the coated drawdown cards were dried in ambient conditions over the time of one week, the coated films were evaluated for chemical resistance.
2. Circles (1 inch in diameter) were cut out of a Fisher brand filter paper.
3. Circles were soaked in 50/50 ethanol/water for 30 seconds.
4. Each soaked circle was placed onto a dried drawdown card, and then covered with a weighing boat to prevent evaporation.
5. After 1 hour, the weighing boat and paper were removed.

6. A white mark in the contact area developed over time, and after overnight, the L* values were measured using the Spectro-Guide 45/0 colorimeter.

7. The chemical damage (inversely related to the chemical resistance) was defined as the difference (ΔL) between the L* value of the white mark (i.e., the largest reading out of at least three readings) and surrounding undamaged background of the film. The percentage of change was also calculated.

Procedure 5—Preparation of Silica/Wax Composite Particles 5.1 Wet Process 2.5-10 grams of polyethylene wax (commercially available from various suppliers including Aldrich) were dissolved in 60-100 ml of toluene with heating. 10 g of silica (silica gel or precipitated silica or fumed silica, commercially available from various suppliers including W. R. Grace) particles were mixed with the wax solution. The mixture was left in a crystallizing dish in a well-ventilated fume hood overnight to allow all of the toluene to evaporate. The "dried" residue was subjected to mortar pestle grinding to allow all the particles to pass a 500 μm screen. The screened particles were then subsequently heated at 130° C. for 1 hour. After drying, the particles were cooled down and the particle size was further reduced with an analytical mill to enable the particles to pass through a 44 μm screen (325 mesh). The screened particles were suitable for use, as is, directly in, for example, a paint formulation.

5.2 Dry Process 4.0 kg of porous silica particles were mixed with 1.0-4.0 kg polyethylene wax under nitrogen in a 10 L Henscher Mixer. The mixer was heated to 120° C. for 2 hours. The mixture was mixed with 3000 rpm for 2 hours. The sample was then cooled down to room temperature, and the composite was subjected to a fluid energy mill under nitrogen to bring the particle size down to 9 μm (median particle size).

Procedure 6—Nitrogen Pore Volume Measurements of Silica and Silica/Wax Composite Particles Nitrogen pore volumes (PV) of the silica and wax composite particles, prepared as described in Examples below, were measured using an Autosorb® iQ analyzer, available from Quantachrome Instrument (Boynton Beach, FL). The degasing for each sample was carried out at 65° C. (i.e., below the melting temperature of the wax of around 80° C.) for 4 hours. Nitrogen adsorption and desorption isotherms were measured at 77K with nitrogen pressure increasing from 0.01% atmosphere to 0.998% atmosphere, and subsequently decreasing from 0.998% atmosphere to 0.025% atmosphere, respectively. The pore volume calculations were measured using the AsiQwin™ 5.0 version program based on BJH theory. See, for example, Barrett et al., "The Determination of Pore Volume and Area Distributions in Porous Substances. I. Computations from Nitrogen Isotherms", *J. Am. Chem. Soc.*, 1951, 73 (1), pp 373-380, the subject matter of which is incorporated herein by reference in its entirety. The measured pore volumes for the composites were reported in examples described below.

Matting Formulation Particle Samples

High pore volume (HPV) and low pore volume (LPV) silica, silica/wax composites, and no pore volume (NPV) wax particles used in matting formulations in the examples are listed in Table 2 below.

TABLE 2

Matting Formulations Used in Coating Compositions

| Sample Number | Sample Nature | Particle Size D50 (μm) | PV (cc/g) | BET Surface Area (m²/g) |
|---|---|---|---|---|
| HPV-1 | Silica gel | 9.0 | 2.0 | 350 |
| HPV-2 | Silica/Wax Composite | 9.0 | 1.3 | 168 |
| HPV-3 | Silica Gel | 8.5 | 1.2 | 350 |
| HPV-4 | Fumed Silica | 9.0 | 1.0 | 120 |
| LPV-1 | Silica/Wax Composite | 9.0 | 0.2 | 42 |
| LPV-2 | Silica Gel | 6.0 | 0.4 | 700 |
| LPV-3 | Silica/Wax Composite | 8.5 | 0.2 | 128 |
| NPV-4 | Wax Particles | 7.0 | Non-porous | n/a |

In Table 2, the reported pore volumes (PV) were measured according to Procedure 6. The median particle sizes of these particles is also provided. HPV-1, HPV-3, HPV-4, LPV-2, LPV-3 are commercially available silica based matting formulation particles. In particular, HPV-1, HPV-3, and LPV-2 are SYLOID® grade silica gel based matting formulations with properties listed and they are from W. R. Grace & Co. HPV-4 is ACEMATT® TS100 fumed silica from Evonik, and NPV-4 is CERAFLOUR® 929 from BYK USA as described above.

HPV-2, LPV-1 and LPV-3 are silica/wax composite particles prepared using Procedure 5. HPV-1 was coated with about 22 wt % and 50 wt % of polyethylene wax to give HPV-2 and LPV-1, respectively. The pore volumes of the silica/wax composite particles are reduced to 1.2 and 0.2 cc/g from the original 2.0 cc/g for the starting silica particles, and the surface areas are also reduced significantly. LPV-3 was a silica gel sample with initial pore volume of around 0.6 cc/g, and the coated with 22% of polyethylene wax. The pore volume for this composite is around 0.2 cc/g, similar to that of LPV-1.

EXAMPLES

Coating formulations with different types of matting formulation blends were prepared according to Procedures 1 (100 g in total amount of formulation for each), and coating on black chart papers were carried out according to Procedure 2, and coated films were evaluated according to Procedure 3. The following examples demonstrate the comparison results from blending of different weight ratios of high pore volume particles and low pore volume particles, the amounts of matting formulations used to reach certain gloss target range, the gloss values measured from the coated films, and the chemical resistance results from the dried, coated films.

Example 1

In Example 1, the blending of HPV-1 and LPV-1 at 5 different ratios in the coating formulation was carried out and the evaluation results of the coated films from these formulations are listed in the Table 3 below.

TABLE 3

| | Coating Formulations Using HPV and LPV Silica | | | | | |
|---|---|---|---|---|---|---|
| Blend Ratio (HPV-1:LPV-1) | Amount of HPV-1 Particles (g) | Amount of LPV-1 Particles (g) | Total Matting Formulations (g) | 60° Gloss of Coated Film | Chemical Resistance (ΔL) | Film Clarity |
| 100%:0 | 2.8 | 0 | 2.8 | 11.9 | 15.4 | 4.6 |
| 56%:44% | 2.1 | 1.7 | 3.8 | 11.5 | 14.8 | 4.6 |
| 30%:70% | 1.4 | 3.3 | 4.7 | 11.7 | 11.9 | 5.0 |
| 12%:88% | 0.7 | 5.0 | 5.7 | 11.6 | 6.1 | 5.4 |
| 0:100% | 0 | 6.6 | 6.6 | 11.0 | 1.2 | 4.8 |

Example 2

In Example 2, the blending of HPV-2 and LPV-1 at 5 different ratios in the coating formulation was carried out and the evaluation results of the coated films from these formulations are listed in Table 4 below.

TABLE 4

| | Coating Formulations Using HPV and LPV Silica | | | | | |
|---|---|---|---|---|---|---|
| Blend Ratio (HPV-2UPV-1) | Amount of HPV-2 Particles (g) | Amount of LPV-1 Particles (g) | Total Matting Formulations (g) | 60° Gloss of Coated Film | Chemical Resistance (ΔL) | Film Clarity |
| 100%:0 | 3.6 | 0 | 3.6 | 14.4 | 9.6 | 5.3 |
| 62%:38% | 2.7 | 1.7 | 4.5 | 12.0 | 8.4 | 4.9 |
| 35%:65% | 1.8 | 3.3 | 5.0 | 11.5 | 6.6 | 5.2 |
| 15%:85% | 0.9 | 5.0 | 5.5 | 11.6 | 3.8 | 4.7 |
| 0:100% | 0 | 6.6 | 6.6 | 11.0 | 1.2 | 4.8 |

Example 3

In Example 3, the blending of HPV-3 and LPV-1 at 5 different ratios in the coating formulation was carried out and the evaluation results of the coated films from these formulations are listed in Table 5 below.

TABLE 5

| | Coating Formulations Using HPV and LPV Silica | | | | | |
|---|---|---|---|---|---|---|
| Blend Ratio (HPV-3:LPV-1) | Amount of HPV-3 Particles (g) | Amount of LPV-1 Particles (g) | Total Matting Formulations (g) | 60° Gloss of Coated Film | Chemical Resistance (ΔL) | Film Clarity |
| 100%:0 | 4.0 | 0 | 4.0 | 11.4 | 17.3 | 5.3 |
| 63%:37% | 3.0 | 1.8 | 4.8 | 11.5 | 10.9 | 5.0 |
| 36%:64% | 2.0 | 3.4 | 5.4 | 12.0 | 9.5 | 5.0 |
| 16%:84% | 1.0 | 5.2 | 6.2 | 11.4 | 6.0 | 5.1 |
| 0:100% | 0 | 7.0 | 7.0 | 11.8 | 2.2 | 5.1 |

Example 4

In Example 4, the blending of HPV-4 and LPV-1 at 5 different ratios in the coating formulation was carried out and the evaluation results of the coated films from these formulations are listed in Table 6 below.

TABLE 6

| | Coating Formulations Using HPV and LPV Silica | | | | | |
|---|---|---|---|---|---|---|
| Blend Ratio (HPV-4:LPV-1) | Amount of HPV-4 Particles (g) | Amount of LPV-1 Particles (g) | Total Matting Formulations (g) | 60° Gloss of Coated Film | Chemical Resistance (ΔL) | Film Clarity |
| 100%:0 | 3.1 | 0 | 3.1 | 13.3 | 12.5 | 5.0 |
| 58%:42% | 2.3 | 1.7 | 4.0 | 12.5 | 10.0 | 4.2 |
| 32%:68% | 1.6 | 3.3 | 4.9 | 11.7 | 8.2 | 4.4 |
| 14%:86% | 0.8 | 5.0 | 5.8 | 11.6 | 4.4 | 4.7 |
| 0:100% | 0 | 6.6 | 6.6 | 11.0 | 1.2 | 4.8 |

Example 5

In Example 5, the blending of HPV-3 and LPV-2 at 5 different ratios in the coating formulation was carried out and the evaluation results of the coated films from these formulations are listed in Table 7 below.

TABLE 7

| | Coating Formulations Using HPV and LPV Silica | | | | | |
|---|---|---|---|---|---|---|
| Blend Ratio (HPV-3UPV-2) | Amount of HPV-3 Particles (g) | Amount of LPV-2 Particles (g) | Total Matting Formulations (g) | 60° Gloss of Coated Film | Chemical Resistance (ΔL) | Film Clarity |
| 100%:0 | 3.5 | 0.0 | 3.5 | 12.5 | 16.6 | 4.7 |
| 55%:45% | 2.6 | 2.2 | 4.8 | 12.5 | 12.9 | 4.6 |
| 29%:71% | 1.8 | 4.3 | 6.1 | 12.5 | 10.6 | 4.5 |
| 14%:86% | 0.9 | 6.5 | 7.4 | 12.5 | 7.2 | 4.3 |
| 0:100% | 0.0 | 8.6 | 8.6 | 12.5 | 4.1 | 3.9 |

Example 6

In Example 6, the blending of HPV-2 and LPV-3 at 5 different ratios in the coating formulation was carried out and the evaluation results of the coated films from these formulations are listed in Table 8 below.

TABLE 8

| | Coating Formulations Using HPV and LPV Silica | | | | | |
|---|---|---|---|---|---|---|
| Blend Ratio (HPV-2:LPV-3) | Amount of HPV-2 Particles (g) | Amount of LPV-3 Particles (g) | Total Matting Formulations (g) | 60° Gloss of Coated Film | Chemical Resistance (ΔL) | Film Clarity |
| 100%:0 | 3.6 | 0.0 | 3.6 | 13.2 | 8.0 | 5.4 |
| 62%:38% | 2.7 | 1.6 | 4.3 | 13.1 | 6.7 | 4.8 |
| 36%:64% | 1.8 | 3.3 | 5.1 | 12.9 | 4.4 | 4.7 |
| 16%:84% | 0.9 | 4.9 | 5.8 | 12.5 | 2.2 | 4.6 |
| 0:100% | 0.0 | 6.5 | 6.5 | 13.1 | 0.3 | 4.4 |

Example 7

In Example 7, the blending of HPV-2 and LPV-1 at 5 different ratios with higher amount of loading (and thus lower gloss values of around or less than 7.0 for the coated films) in the coating formulation was carried out and the evaluation results of the coated films from these formulations are listed in Table 9 below.

TABLE 9

| Coating Formulations Using HPV and LPV Silica | | | | | |
| Blend Ratio (HPV-2:LPV-1) | Amount of HPV-2 Particles (g) | Amount of LPV-1 Particles (g) | Total Matting Formulations (g) | 60° Gloss of Coated Film | Chemical Resistance (ΔL) |
| --- | --- | --- | --- | --- | --- |
| 100%:0 | 5.0 | 0 | 5.0 | 6.8 | 11.1 |
| 63%:37% | 3.75 | 2.18 | 5.9 | 7.0 | 8.7 |
| 36%:64% | 2.5 | 4.35 | 6.9 | 6.6 | 5.6 |
| 16%:84% | 1.25 | 6.53 | 7.8 | 6.8 | 3.9 |
| 0:100% | 0 | 8.7 | 8.7 | 6.9 | 2.3 |

As can be seen from Examples 1-7, the general trend was that with increased amounts of LPV particles in the blend, the total matting formulation requirement to reach similar gloss was higher to reach silica gloss levels, but the chemical resistance got better (in the form of smaller ΔL) with increased portion of LPV particles in the formulations.

FIG. 1 depicts plots of (i) chemical damage (i.e., ΔL shown by smooth, solid lines) as noted along the left y-axis and (ii) percent weight matting agent requirement to reach 11-14 gloss target range (i.e., shown by dotted lines) as noted along the right y-axis of films containing exemplary matting agents (i.e., from Examples 1-6) of the present invention versus (a) the amount of low pore volume particles and high low pore volume particles within a given matting formulation blend used to form the films. As can been seen in FIG. 1, ΔL values (i.e., chemical resistance) are lower as the amount of low pore volume particles is increased, and especially lower (i.e., as low as 6.0 of less) as the amount of low pore volume particles becomes greater than about 50 wt % based on a total weight of the low pore volume particles and the high pore volume particles.

Comparative Example 1

In Comparative Example 1, the blending of HPV-4 and NPV-4 at 5 different ratios in the coating formulation was carried out and the evaluation results of the coated films from these formulations are listed in Table 10 below.

TABLE 10

| Coating Formulations Using HPV Silica and NPV Wax Particles | | | | | | |
| Blend Ratio (HPV-4:NPV-4) | Amount of HPV-4 Particles (g) | Amount of NPV-4 Particles (g) | Total Matting Formulations (g) | 60° Gloss of Coated Film | Chemical Resistance (ΔL) | Film Clarity |
| --- | --- | --- | --- | --- | --- | --- |
| 100%:0 | 3.1 | 0 | 3.1 | 13.3 | 17.3 | 5.65 |
| 57%:43% | 2.3 | 1.8 | 4.1 | 14.4 | 11.5 | 5.82 |
| 31%:69% | 1.6 | 3.5 | 5.1 | 13.1 | 8.2 | 5.91 |
| 13%:87% | 0.8 | 5.3 | 6.1 | 13.2 | 3.9 | 6.48 |
| 0:100% | 0 | 7.0 | 7.0 | 13.6 | 0.4 | 6.90 |

As can be seen, in the current common practice, the blending of high pore volume silica with pure wax-based matting formulation can reach the gloss and chemical resistance targets with various ratios of different types of matting formulations.

However, in comparison to the comparative examples (i.e., samples containing pure wax-based matting formulations) in Table 10, the film clarity values of various blends in Example 1-6 and in Tables 3-8 (with similar gloss range of 11 to 14.4) were in general lower than 5.7, and by using these blends, one can overcome the shortcoming of poorer film clarity involving pure wax based matting formulations (with film clarity value as high as 6.90).

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A matting formulation for aqueous coating composition comprising high pore volume silica particles blended with an amount of low pore volume silica particles that is sufficient to provide, when the matting formulation is incorporated into an aqueous coating composition and dried onto a substrate to form a film, the film having increased chemical resistance at a 60° gloss value target, wherein the high pore volume silica particles have a median pore volume of greater than 0.80 cc/g as determined by Barrett-Joyner-Halenda (BJH) method and the low pore volume silica particles have a median pore volume equal to or less than 0.80 cc/g or less as determined by the BJH method, wherein said low pore volume silica particles are present in an amount of from about 1.0 weight percent (wt %) to about 99.0 wt %, and said high pore volume silica particles are present in an amount of from about 99.0 wt % to about 1.0 wt %, based on a total weight of said low pore volume silica particles and said high pore volume silica particles.

2. The matting formulation of claim 1, wherein the 60° gloss value target is between about 3.0 and about 30.0 as measured using a portable Micro-TRI-Gloss meter.

3. The matting formulation of claim 1, wherein, when incorporated into the aqueous coating composition and applied onto a substrate, enables the aqueous coating composition to form a film having a chemical resistance rating of from 3 to 5 within a scale of 1 to 5 using test method EN 12720 or DIN68861-1.

4. The matting formulation of claim 1, wherein the film is a clear coat film.

5. The matting formulation of claim 1, wherein the substate is wood, plastics, or black chart paper.

6. The matting formulation of claim 1, wherein the aqueous coating composition, when applied onto a plain, smooth and non-penetrating black chart paper and dried, forms a film having a 50/50 water/ethanol damage 1 hr AL* value equal to or less than 10.0 units as measured using a portable Spectro-Guide 45/0 colorimeter.

7. The matting formulation of claim 1, wherein the aqueous coating composition, when applied onto a plain, smooth and non-penetrating black chart paper and dried, forms a film having a film clarity AL* equal to or less than 7.0 units as measured using a portable Spectro-Guide 45/0 colorimeter.

8. The matting formulation of claim 1, wherein the median pore volume of the low pore volume silica particles differs from the median pore volume of the high pore volume silica particles by at least 0.1 cc/g.

9. The matting formulation of claim 1, wherein said low pore volume silica particles have a median pore volume of from about 0.01 cc/g to 0.79 cc/g as determined by the BJH method.

10. The matting formulation of claim 1, wherein said high pore volume silica particles have a median pore volume of from 0.80 cc/g to about 2.40 cc/g as determined by the BJH method.

11. The matting formulation of claim 1, wherein said high pore volume silica particles and said low pore volume silica particles consist essentially of silica.

12. The matting formulation of claim 1, wherein said low pore volume silica particles further comprise one or more first waxes in an amount sufficient to at least partially fill pores of said low pore volume silica particles.

13. The matting formulation of claim 12, wherein said high pore volume silica particles further comprise one or more second waxes in an amount sufficient to at least partially fill pores of the high pore volume silica particles.

14. The matting formulation of claim 13, wherein each of said one or more first waxes and said one or more second waxes independently comprises a hydrocarbon wax, a paraffin wax, a polyethylene wax, a polypropylene wax, a plant wax, an animal wax, or any combination thereof.

15. The matting formulation of claim 1, wherein each of said low pore volume silica particles and said high pore volume silica particles independently comprises silica gel, precipitated silica, fumed silica particles, or any combination thereof.

16. The matting formulation of claim 1, wherein said low pore volume silica particles and said high pore volume silica particles are free-flowing particles.

17. A method of preparing the matting formulation of claim 1, said method comprising:

combining the low pore volume silica particles and the high pore volume silica particles to form a blend of the low pore volume silica particles and the high pore volume silica particles.

18. The method of claim 17, further comprising: reducing the particle size of the low pore volume silica particles or the high pore volume silica particles to obtain silica particles having a final particle size of less than 100 microns (pm), and said reducing step results in low pore volume silica particles or high pore volume silica particles having a final particle size of less than about 45.0 pm.

19. A coating composition comprising the matting formulation of claim 1.

20. A substrate coated with the coating composition of claim 19.

* * * * *